(12) United States Patent
Hui et al.

(10) Patent No.: US 7,739,344 B2
(45) Date of Patent: *Jun. 15, 2010

(54) INSTANT MESSAGE METHOD TO PROVIDE A DELAYED ALARM/REMINDER

(75) Inventors: Stephen Yuway Hui, Austin, TX (US); Wayne Ralph Johnnie, Austin, TX (US); David Paul Kuiken, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/129,508

(22) Filed: May 29, 2008

(65) Prior Publication Data

US 2008/0263165 A1    Oct. 23, 2008

Related U.S. Application Data

(63) Continuation of application No. 11/336,223, filed on Jan. 20, 2006.

(51) Int. Cl.
*G06F 15/16* (2006.01)
(52) U.S. Cl. .................................................. 709/206
(58) Field of Classification Search ................ 709/206, 709/207, 225, 224, 204; 340/993, 825.29, 340/573, 541, 540, 531, 506, 286.02
See application file for complete search history.

(56) References Cited

U.S. PATENT DOCUMENTS 6,807,565 B1   10/2004   Dodrill et al.
2004/0117443 A1*  6/2004   Barsness ...................... 709/204
2004/0128181 A1*  7/2004   Zurko et al. ...................... 705/9
2004/0216059 A1*  10/2004  Vong et al. .................. 715/840
2005/0004881 A1   1/2005   Klug
2005/0058268 A1*  3/2005   Koch ...................... 379/207.16
2005/0080866 A1   4/2005   Kent, Jr. et al.

OTHER PUBLICATIONS

Microsoft, Plan meetings, 2003, Microsoft Corportations, https://exchange.lse.ac.uk/exchweb/help/USA/ie5/Three_E.htm.*
Judy Freed, Using Microsoft Outlook 2003, A Beginners Guide, Email and Calendars, Apr. 19, 2004, UNC Charlotte.*

* cited by examiner

*Primary Examiner*—Wing F Chan
*Assistant Examiner*—Charles Murphy
(74) *Attorney, Agent, or Firm*—Yee & Associates, P.C.; David A. Mims, Jr.

(57) ABSTRACT

A mechanism for providing instant messaging (IM) users with an alarm to remind users of an event or to re-join an IM chat. An instant message requesting a user to participate in an event is received at an IM client. If the user cannot participate in the event, the user creates an alarm message defining a delay time period after which the user can participate in the event, which is sent to users in the IM chat session. Responsive to receiving the alarm message at an IM client, a countdown of the delay time period is initiated. Additionally, the receipt of the alarm message and timer countdown processing may occur on the IM server, which dispatches a message to the IM client upon timer expiration. Upon expiration of the timer, an alarm popup window is displayed which reminds the user to participate in the event.

14 Claims, 13 Drawing Sheets

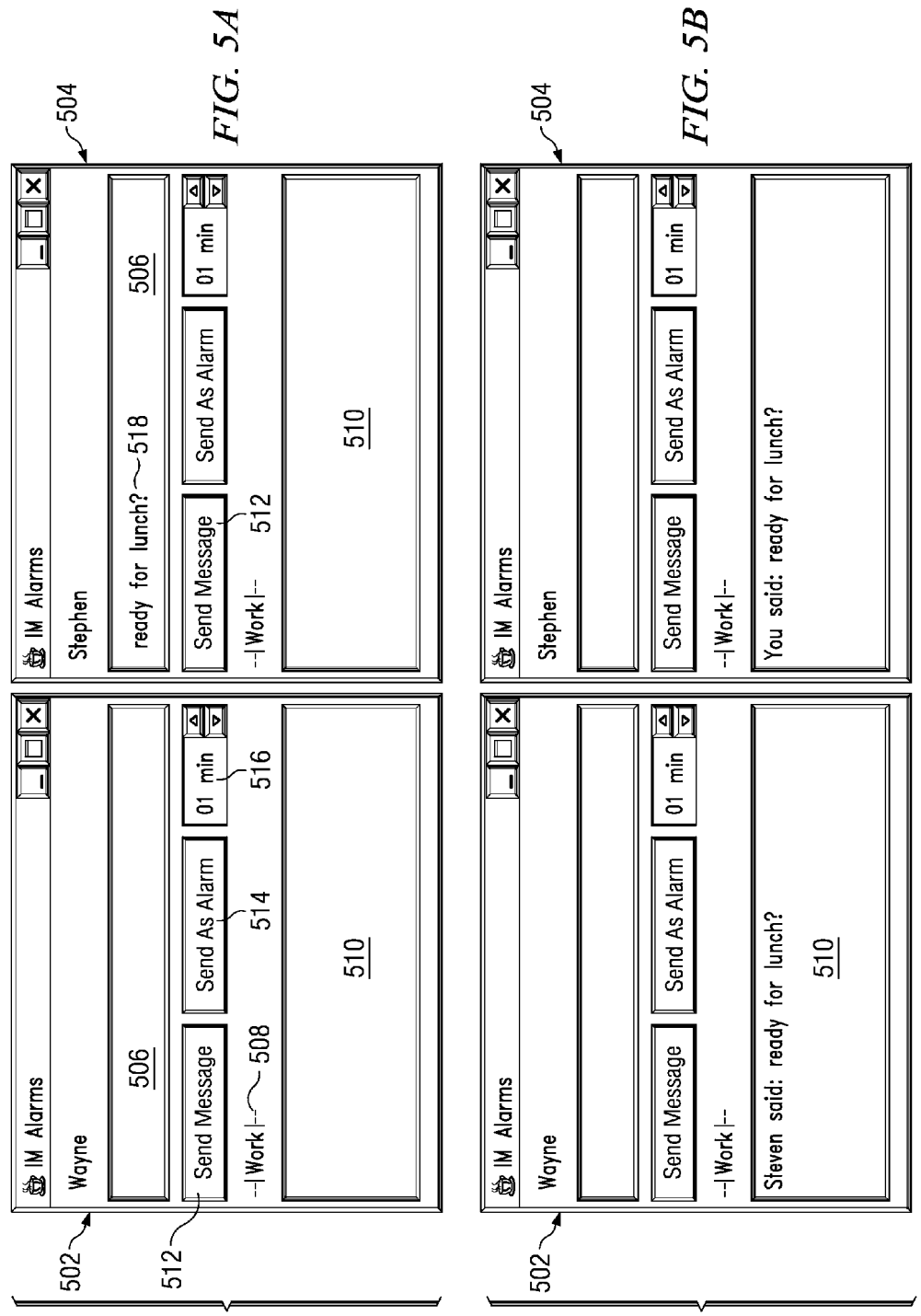

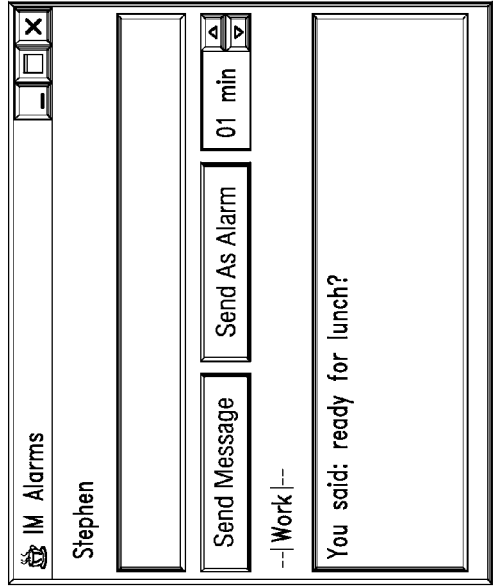
FIG. 5C
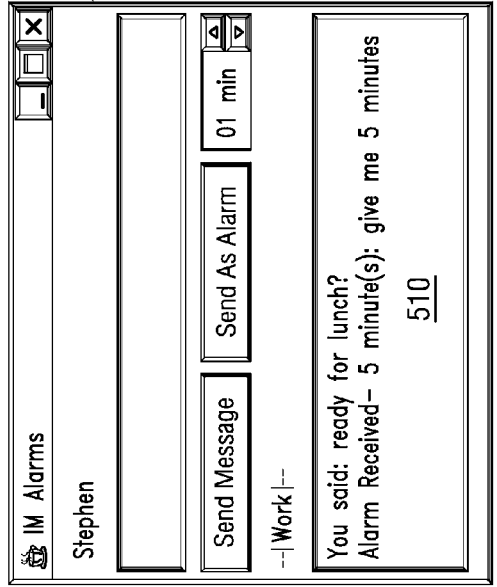
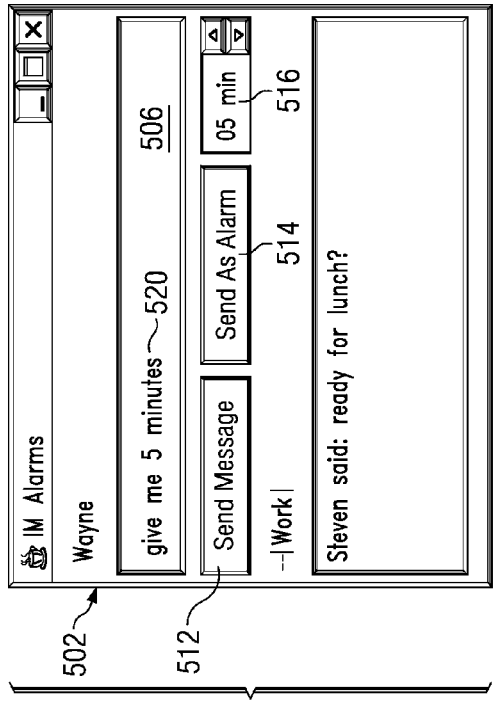
FIG. 5D
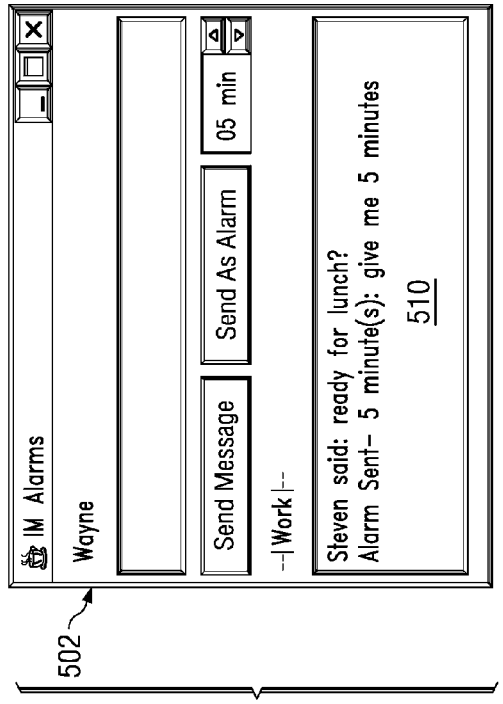

```
Import java.awt.Color;
Import java.awt.Dimension;
Import java.awt.event.WindowEvent;
Import java.awt.event.WindowListener;
Import javax.swing.JFrame;
Import javax.swing.JSplitPane;

/**
 *<p>Title: </p>
 *<p>Description: </p>
 *<p>Copyright: Copyright (c) 2005</p>
 *<p>Company: </p>
 *@author not attributable
 *@version 1.0
 */
public class IMAlarms extends JFrame implements WindowListener {
  JSplitPane jSplitPane = new JSplitPane();
  IMApplication splitLeftApp = new IMApplication(this, "Wayne");
  IMApplication splitRightApp = new IMApplication(this, "Stephen");

public IMAlarms () {
    try {
      jbinit();
      addWindowListener(this);
      pack();
      show();
    }
    catch(Exception e) {
     e.printStackTrace();
    }
  }
```

```
private void jbinit() throws Exception {      600
    setResizable(false);
    setTitle("IM Alarms Prototype");

// Left panel in the JSplitPane
    splitLeftApp.setBackground(new Color(156, 174, 198));
    splitLeftApp.setPreferredSize(new Dimension(400, 205)); //505
    splitLeftApp.addBuddyIMApplication(splitRightApp);

// Right panel in the JSplitPane
    splitRightApp.setBackground(new Color(206, 215, 231));
    splitRightApp.setPreferredSize(new Dimension(400, 205));
    splitRightApp.addBuddyIMApplication(splitLeftApp);

getContentPane().add(JSplitPane);
    jSplitPane.setEnabled(false);
    jSplitPane.setDoubleBuffered(true);
    jSplitPane.setLeftComponent(splitLeftApp);
    jSplitPane.setRightComponent(splitRightApp);
    jSplitPane.setDividerSize(5);
} public static void main(StringLarge) {
    IMAlarms IMAlarms1 = new IMAlarms();
} private void shutdown() {
    System.exit(0);
}

//WindowListener events
public void windowActivated(WindowEvent we) {;}
public void windowClosed(WindowEvent we) {;}
public void windowClosing(WindowEvent we) {shutdown();}
public void windowDeactivated(WindowEvent we) {;}
public void windowDeiconified(WindowEvent we) {;}
public void windowIconified(WindowEvent we) {;}
public void windowOpened(WindowEvent we) {;}
}
```

```
import java.awt.event.ActionEvent;
import java.awt.event.ActionListener;
import java.awt.event.KeyEvent;
import java.awt.event.KeyListener;
import java.awt.event.MouseEvent;
import java.awt.event.MouseListener;
import java.awt.Color;
import java.awt.Rectangle;
import java.awt.Toolkit;
import java.util.Timer;
import java.util.Vector;
import javax.swing.*;
import javax.swing.event.ChangeEvent;
import javax.swing.event.ChangeListener;

/**
 * <p>Title: IMAlarms</p>
 * <p>Description: IM Alarm System Prototyping</p>
 * <p>Copyright: Copyright (c) 2004</p>
 * <p>Company: IBM</p>
 * @author Wayne Johnnie
 * @version 0.1
 */
public class IMApplication extends JPanel implements ActionListener, ChangeListener, MouseListener, KeyListener {
  String username;
  String curThought = "Work";
  IMAlarms imApp;
  IMApplication buddy;
  JTextArea receivedA = new JTextArea();
  JScrollPane scrollA = new JScrollPane(receivedA);
  JLabel labelA = new JLabel("-- | Work | --");
  JTextArea receivedB = new JTextArea();
  JScrollPane scrollB = new JScrollPane(receivedB);
  JTextArea outgoing = new JTextArea();
  JButton sendButton = new JButton("Send Message");
  JButton alarmButton = new JButton("Send As Alarm");
  Vector alarmList = new Vector();
  SpinnerListModel spinnerList = new SpinnerListModel();
  JSpinner timeSpinner = new JSpinner(spinnerList);
  String newline = System.getProperty("line.separator");

public IMApplication(IMAlarms im, String name) {
    username = name;
    imApp = im;
    try {
      jbinit();
    }
    catch(Exception e) {
      e.printStackTrace();
    }
  }
```

```
        ⎧ public void receiveAlarm(String msg, Int timerMinutes) {
706 ⎨     Toolkit.getDefaultToolkit().beep();
        ⎩                                                                    700
          // Display the message in the appropriate thought stream
          receivedA.append("Alarm Received- " + timerMinutes + " minute(s); " + mag);
          Timer newTimer = new Timer();
          newTimer.schedule(new IMAlarmTask(msg), timerMinutes*1000*60);
        }                              ⎺⎺710
        ⎧ public void receiveMessage(String msg, String thought) {
702 ⎨     Toolkit.getDefaultToolkit().beep();
        ⎩
          // Display the message in the appropriate thought stream
          receivedA.append(buddy.username + " said: " + msg);
        }
        ⎧ public void sendAlarm(String msg, Int timerMinutes) {
708 ⎨     // Display the outgoing alarm in the appropriate thought stream
        ⎩ receivedA.append("Alarm Sent - " + timerMinutes + " minute(s); " + msg + newline);
          // Have the buddy receive the message
          buddy.receiveAlarm(msg + newline, timerMinutes);
        }
        ⎧ public void sendMessage(String msg, String thought) {
704 ⎨     // Display the outgoing message in the appropriate thought stream
        ⎩ receivedA.append("You said: " + msg + newline);
          // Have the buddy receive the message
          buddy.receiveMessage(msg + newline, thought);
        }
        private void repositionThoughts() {
          System.out.println("Need to reposition the visible thoughts still");
        }
        public void addBuddyIMApplication(IMApplication targ) { buddy = targ; } private void jbInit() throws Exception {
          this.setLayout(null);

// Add your username
          JLabel userLabel = new JLabel(username);
          userLabel.setBounds(new Rectangle(5, 10, 390, 20));

// Add alarm button
          alarmButton.setBounds(new Rectangle(150, 60, 140, 20));
          alarmButton.setActionCommand("sendAlarm");
          alarmButton.addActionListener(this);

// Setup the new message area
          outgoing.setText("");
          outgoing.setBounds(new Rectangle(5, 35, 390, 20));
          outgoing.addKeyListener(this);

// Setup the send new message button
          sendButton.setBounds(new Rectangle(6, 60, 140, 20));
          sendButton.setActionCommand("send");
          sendButton.addActionListener(this);
```

```
// Setup the thought spinner, which contains a list of the current thought threads
  timeSpinner.setBounds(new Rectangle(295, 60, 100, 20));
  timeSpinner.addChangeListener(this);
  ((JSpinner.DefaultEditor)timeSpinner.getEditor()).getTextField().setFocusable(false);
  alarmList.add("01 min");
  alarmList.add("05 min");
  alarmList.add("10 min");
  alarmList.add("30 min");
  alarmList.add("60 min");
  spinnerList.setList(alarmList);
  spinnerList.setValue(alarmList.elementAt(0));

// Setup the received messages area for "Work" thought
  receivedA.setText("");
  receivedA.setEnabled(false);
  labelA.setBounds(new Rectangle(20, 80, 390, 20));
  labelA.setForeground(Color.red);
  scrollA.setBounds(new Rectangle(5, 100, 390, 100));
  receivedA.addMouseListener(this);
  receivedA.setDisabledTextColor(Color.black);
  receivedA.setAutoscrolls(true);
  scrollA.setBorder(BorderFactory.createLineBorder(Color.grey, 1));
  setHighlightBorder(scrollA);

this.add(userLabel, null);
  this.add(scrollA, null);
  this.add(labelA, null);
  this.add(scrollB, null);
  this.add(outgoing, null);
  this.add(timeSpinner, null);
  this.add(alarmButton, null);
  this.add(sendButton, null);
}
void setHighlightBorder(JScrollPane sel) {
  scrollA.setBorder(BorderFactory.createLineBorder(Color.gray, 1));
  scrollB.setBorder(BorderFactory.createLineBorder(Color.gray, 1));

sel.setBorder(BorderFactory.createLineBorder(Color.red, 2));
}
// KeyListener Methods
public void keyTyped(KeyEvent ke) {;}
public void keyReleased(KeyEvent ke) {;}
public void keyPressed(KeyEvent ke) {
  if (ke.getKeyCode() == KeyEvent.VK_ENTER) {
    gotSendCommand();
    ke.consume();
  }
}
```

*FIG. 7D*

```
// MouseListener Methods
public void mouseEntered(MouseEvent me) {;}
public void mouseExited(MouseEvent me) {;}                          700
public void mousePressed(MouseEvent me) {;}
public void mouseReleased(MouseEvent me) {;}
public void mouseClicked(MouseEvent me) {;}

// ChangeListener Methods
public void stateChanged(ChangeEvent ce) {
  String val = ((JSpinner)ce.getSource()).getValue().toString();
  if (val.equalsIgnoreCase("Work")) { setHighlightBorder(scrollA); }
  else if (val.equalsIgnoreCase("Lunch")) { setHighlightBorder(scrollB); }
}
public void gotSendCommand() {
  String out = outgoing.getText();
  If (out.length() > 0) {
    sendMessage(outgoing.getText(), curThought);
    outgoing.setText("");
  }
} public void gotSendAlarmCommand() {
  String out = outgoing.getText();
  If (out.length() > 0) {
    String timerVal = (String)timeSpinner.getValue();
    Int minutes = 0;
    if (timerVal.equalsIgnoreCase("01 min")) { minutes = 1; }
    else if (timerVal.equalsIgnoreCase("05 min")) { minutes = 5; }
    else if (timerVal.equalsIgnoreCase("10 min")) { minutes = 5; }
    else if (timerVal.equalsIgnoreCase("30 min")) { minutes = 5; }
    else if (timerVal.equalsIgnoreCase("60 min")) { minutes = 5; }
    sendAlarm(out, minutes);
    outgoing.setText("");
  }
}

// ActionListener Methods
public void actionPerformed(ActionEvent ae) {
  String cmd = ae.getActionCommand();

If (cmd.equalsIgnoreCase("send")) { gotSendCommand(); }
  else if (cmd.equalsIgnoreCase("sendAlarm")) { gotSendAlarmCommand(); } outgoing.requestFocus();
  }
}
```

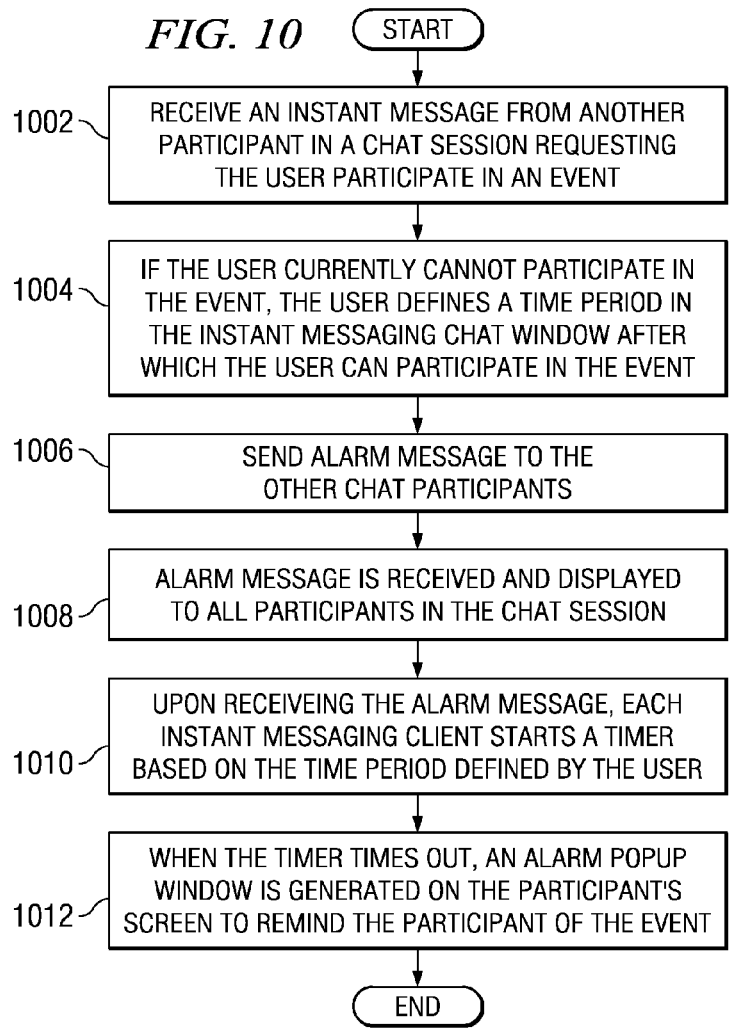

FIG. 8

```
Import java.util.TimerTask;
Import javax.swing.JDialog;

public class IMAlarmTask extends TimerTask {
  String displayMsg = "";

public IMAlarmTask(String.msg) { displayMsg = msg; } public void run() {
    IMAlarmDisplay alarm = new IMAlarmDisplay(displayMsg);
    alarm.show();
  }
}
```
802 points to the IMAlarmDisplay line.

FIG. 10

START

1002 — RECEIVE AN INSTANT MESSAGE FROM ANOTHER PARTICIPANT IN A CHAT SESSION REQUESTING THE USER PARTICIPATE IN AN EVENT

1004 — IF THE USER CURRENTLY CANNOT PARTICIPATE IN THE EVENT, THE USER DEFINES A TIME PERIOD IN THE INSTANT MESSAGING CHAT WINDOW AFTER WHICH THE USER CAN PARTICIPATE IN THE EVENT

1006 — SEND ALARM MESSAGE TO THE OTHER CHAT PARTICIPANTS

1008 — ALARM MESSAGE IS RECEIVED AND DISPLAYED TO ALL PARTICIPANTS IN THE CHAT SESSION

1010 — UPON RECEIVEING THE ALARM MESSAGE, EACH INSTANT MESSAGING CLIENT STARTS A TIMER BASED ON THE TIME PERIOD DEFINED BY THE USER

1012 — WHEN THE TIMER TIMES OUT, AN ALARM POPUP WINDOW IS GENERATED ON THE PARTICIPANT'S SCREEN TO REMIND THE PARTICIPANT OF THE EVENT

END

FIG. 9A

```
Import java.awt.*;
Import java.text.SimpleDateFormat;                    900
Import java.util.Calendar;
Import java.swing.*;

/**
* <p>Title: </p>
* <p>Description: </p>
* <p>Copyright: Copyright (c) 2005</p>
* <p>Company: </p>
* @author not attributable
* @version 1.0
*/
public class IMAlarmDisplay extends JDialog {
  JPanel mainPanel = new JPanel();
  JTextArea alarmText = new JTextArea();

public IMAlarmDisplay(String msg) throws HeadlessException {
902 ~  SimpleDateFormat myTime = new SimpleDateFormat("E h:mm a");
       String time = myTime.format(Calendar.getInstance().getTime());
904 ~  alarmText.setText(time + "\n" + msg);
    try {
      jbinit();
    }
    catch(Exception e) {
      e.printStackTrace();
    }
  }
  public IMAlarmDisplay() {
    try {
      jbinit();
    }
    catch(Exception e) {
      e.printStackTrace();
    }
  }
  private void center() {
  int posX = (int)((Toolkit.getDefaultToolkit().getScreenSize().getWidth() - 200)/2);
  int posY = (int)((Toolkit.getDefaultToolkit().getScreenSize().getHeight() - 200)/2);
    setLocation(posX, posY);
  }
```

*FIG. 9B*

```
private void jbinit() throws Exception {
  setModel(false);
  setResizable(false);                              900
  setTitle("Alarm Reminder");
  setSize(200, 200);
  center();

alarmText.setBackground(new Color(181, 194, 214));
  alarmText.setFont(new java.awt.Font("Dialog", 1, 14));
  alarmText.setForeground(Color.blue);
  alarmText.setMaximumSize(new Dimension(200, 200));
  alarmText.setMinimumSize(new Dimension(200, 200));
  alarmText.setPreferredSize(new Dimension(200, 200));
  alarmText.setDisabledTextColor(Color.blue);
  alarmText.setEditable(false);
  alarmText.setLineWrap(true);
  alarmText.setWrapStyleWord(true);
  alarmText.setBounds(new Rectangle(0, 0, 200, 200));

mainPanel.setLayout(null);
  mainPanel.setBackground(new Color(181, 194, 214));
  mainPanel.setForeground(Color.blue);
  mainPanel.setMaximumSize(new Dimension(200, 200));
  mainPanel.setMinimumSize(new Dimension(200, 200));
  mainPanel.setPreferredSize(new Dimension(200, 200));
  mainPanel.setBounds(new Rectangle(0, 0, 200, 200));
  mainPanel.add(alarmText, null);
  getContentPanel().setSize(200, 200);
  getContentPanel().setLayout(null);
  getContentPanel().add(mainPanel, null);
  }
}
```

INSTANT MESSAGE METHOD TO PROVIDE A DELAYED ALARM/REMINDER

This application is a continuation of application number 11/336,223, filed Jan. 20, 2006, status pending.

BACKGROUND OF THE INVENTION

1. Field of the Invention

The present invention relates generally to an improved instant messaging system, and in particular, the present invention relates to a computer implemented method, data processing system, and computer program product for providing instant messaging users with an alarm to remind the users of an event or to re-join an instant messaging chat.

2. Description of the Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Existing instant messaging systems provide users with chat windows that allow the users to communicate in real-time. A chat window provides an interface for a user to input text and send messages to other users. Users may also communicate with each other and agree to participate in future events, such as attending a meeting in 30 minutes or going to lunch in 5 minutes. The users may continue to work or perform other tasks in the meantime. Consequently, when the agreed upon times of 5 or 30 minutes has passed, the users may be too distracted in their current activities to realize that the time has passed. Thus, a user may miss or be late to the scheduled meeting, or the users may not actually go to lunch until much later.

Therefore, it would be advantageous to have a computer implemented method, data processing system, and computer program product for overcoming the deficiencies in the existing art by providing a mechanism for providing instant messaging users with an alarm to remind the users of an event or to re-join an instant messaging chat.

SUMMARY OF THE INVENTION

Embodiments of the present invention provide a computer implemented method, data processing system, and computer program product for providing instant messaging users with an alarm to remind the users of an event or to re-join an instant messaging chat. An instant message that includes a request for a user to currently participate in an event is received at an instant messaging client. If the user is currently unable to participate in the event, the user may create an alarm message that defines a delay time period after which the user is able to participate in the event. The alarm message is then sent to users in the instant messaging chat session. Responsive to receiving the alarm message at an instant messaging client, a countdown of the delay time period is initiated. Additionally, the receipt of the alarm message and timer countdown processing may occur on the instant messaging server, which would dispatch a message to the instant messaging client when the timer expires. Upon expiration of the delay time period, an alarm popup window is displayed on the instant messaging client, wherein the alarm reminds the user to participate in the event.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A-5E are exemplary instant messaging chat windows used to send and receive instant messages and alarms in accordance with an illustrative embodiment of the present invention;

FIGS. 6A-6B depict an example of source code for initiating an instant messaging application in accordance with an illustrative embodiment of the present invention;

FIGS. 7A-7D depict an example of source code for sending and receiving instant messages and alarms in accordance with an illustrative embodiment of the present invention;

FIG. 8 depicts an example of timing source code in accordance with an illustrative embodiment of the present invention;

FIGS. 9A-9B depict an example of source code for providing an alarm to a user in accordance with an illustrative embodiment of the present invention; and FIG. 10 is a flowchart of a process for providing instant messaging users with an alarm to remind the users of an event or to re-join an instant messaging chat in accordance with an illustrative embodiment of the present invention.

DETAILED DESCRIPTION OF THE PREFERRED EMBODIMENT

Figure 1:
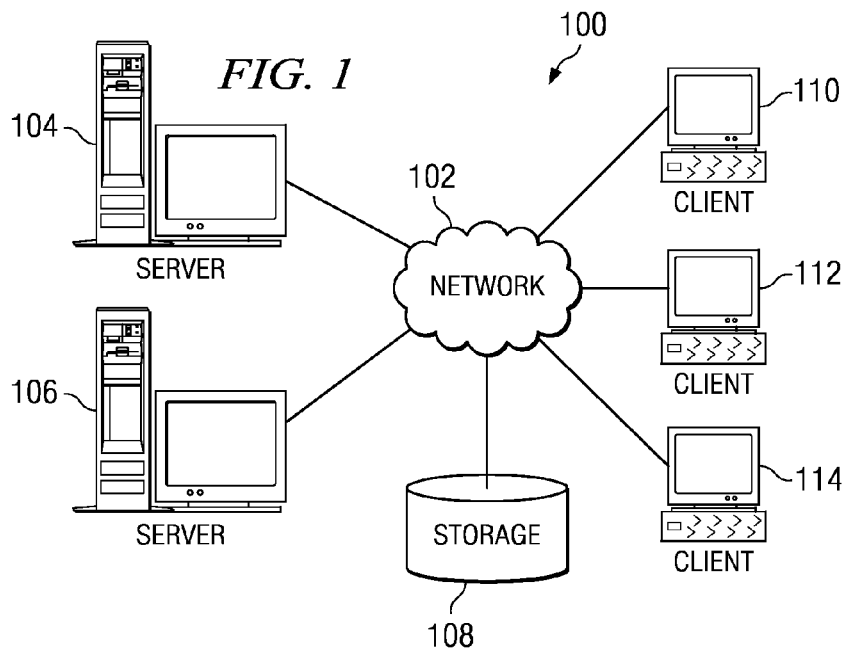
FIG. 1 depicts a representation of a network of data processing systems in which the present invention may be implemented.
Figure 2:
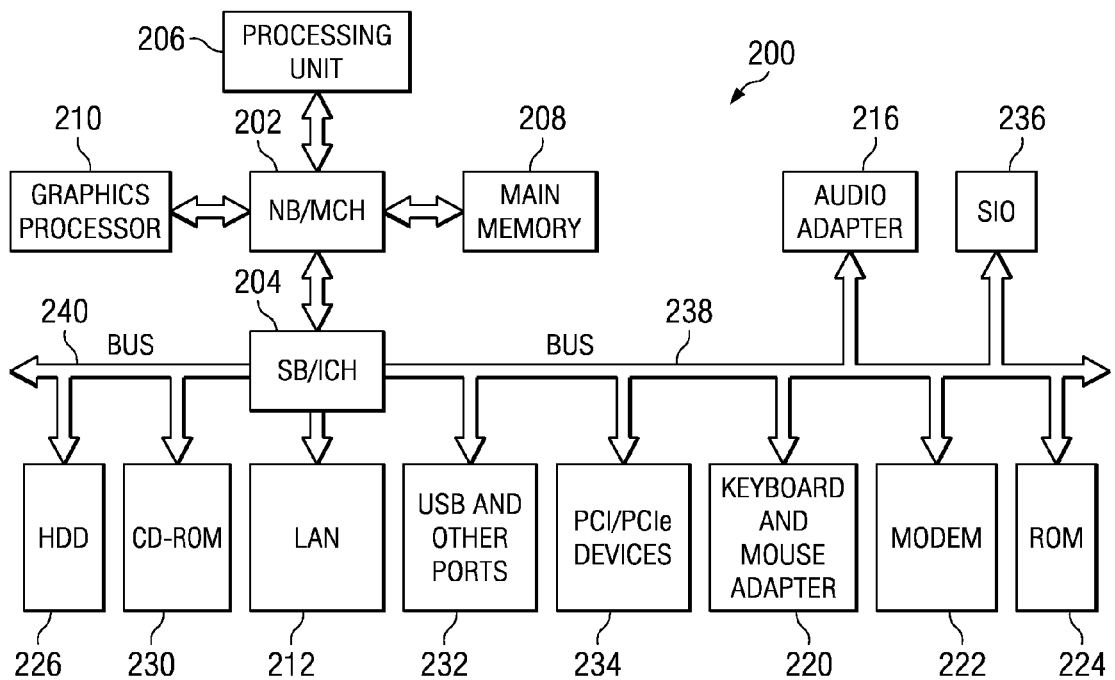
FIG. 2 is a block diagram illustrating a data processing system in which the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® Eserver™ PSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention extend the functionality of existing instant messaging systems by allowing users to set alarms or reminders for an event within the context of the instant messaging system, without having to use a calendaring system to schedule a reminder for the event. In particular, the mechanism of the present invention allows users to define a period of time within an instant messaging window in which the users will participate in an event, such as attending a meeting, going to lunch, and the like. Upon the expiration of the defined time period, the instant messaging system will notify each of the chat participants via a visual and/or audio alarm, such as a popup window or audible alert. A benefit of the mechanism of the present invention is that although a group of instant messaging users at work may agree to go to lunch in 10 minutes for example, if the users continue working in the meantime, what originally was supposed to be a 10 minute delay before going to lunch can result in a 20 minute delay, as the users were focused on other activities. Thus, with the mechanism of the present invention, instant-messaging users may be provided with a reminder or alarm to alert the users that a defined period of time has elapsed. The users may then be reminded to participate in the agreed upon event or be redirected back to the chat window for an agreed upon chat meeting in a timely manner.

Figure 3:
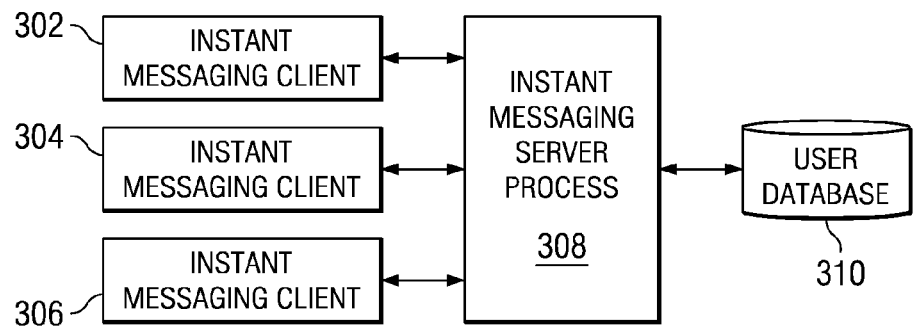
FIG. 3 is a block diagram illustrating components used in managing messages in accordance with an illustrative embodiment of the present invention.

Turning now to FIG. 3, a block diagram illustrating components used in an instant messaging system in accordance with a preferred embodiment of the present invention is shown. In this illustrative example, a user at instant messaging client 302 may send or exchange messages with other users at instant messaging clients 304 and 306. These instant messaging clients may be executing on a data processing system, such as data processing system 200 in FIG. 2. The exchange of messages in these examples is facilitated through instant messaging server process 308. This process allows for users to find other users within the instant messaging system as well as aid in the exchange of messages between different users.

Depending on the particular instant messaging system, instant messaging server process 308 may only be involved in providing an indication of when particular users are online and for establishing initial contacts while users contacting users already on a buddy list may contact those users directly after seeing that a particular user is online. Instant messaging server process 308 may be located on a server, such as servers 104 or 106 in FIG. 1.

In these examples, the different users registered to the instant messaging system are stored in user database 310. This user database provides information needed to search for and find other users as well as contact users when they are online.

Figure 4:
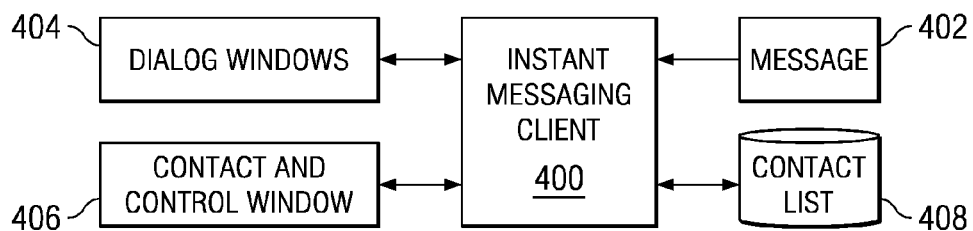
FIG. 4 is a diagram illustrating an instant messaging client in accordance with an illustrative embodiment of the present invention.

Turning next to FIG. 4, a diagram illustrating an instant messaging client is depicted in accordance with a preferred embodiment of the present invention. The components illustrated in FIG. 4 may be found in an instant messaging client, such as instant messaging clients 302, 304, or 306 in FIG. 3. These components may be implemented in a data processing system, such as data processing system 200 in FIG. 2.

In the illustrative example, instant messaging client 400 processes messages, such as message 402, received from users located on remote data processing systems. As messages are received, these messages are presented in dialog windows 404. Additionally, dialog windows 404 provide an interface for a user to input text to send messages to other users.

Contact and control window 406 is presented by instant messaging client 400 to provide the user with a list of user names, as well as other information. Contact and control window 406 also provides an interface to allow a user to set different preferences. For example, the user may set passwords required to access different names used in instant messaging sessions.

Also, a user may employ contact and control window 406 to set other preferences, such as colors and fonts used in instant messaging client 400. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 406 is stored in contact list 408 in these examples. Additional user or screen names may be added to or deleted from contact list 408. This contact list is employed in presenting the list of names within contact and control window 406.

FIGS. 5A-5E are exemplary instant messaging chat windows used to send and receive instant messages and alarms in accordance with an illustrative embodiment of the present invention. Although there are many scenarios of receiving an instant message and not being able to participate in the suggested event at that moment or needing a few minutes before being able to focus on the sender of the message, the instant messaging chat windows in FIGS. 5A-5E illustrate a scenario of two employees who want to meet for lunch. The instant messaging chat windows are examples of dialog windows, such as dialog window 404 in FIG. 4.

In these illustrative examples, the chat session comprises a conversation between two users, Wayne and Stephen. Instant messaging chat window 502 is displayed to Wayne, and instant messaging chat window 504 is displayed to Stephen. Instant messaging chat windows 502 and 504 may include properties present in a standard chat window, such as text-to-send box 506, conversation thread 508, conversation display area 510, and Send Message button 512. Text-to-send box 506 is used to receive dialog from the participants of the chat session. When a user enters dialog into text-to-send box 506 and clicks on Send Message button 512 or executes the appropriate keystrokes, the dialog in the text input area on the user's screen is displayed to each participant in the participant's respective conversation display area 510. Conversation thread 508 indicates the type of chat conversation in the instant messaging window (e.g., work, personal, etc.).

Instant messaging chat windows 502 and 504 also include Send as Alarm button 514 and delay time field 516. When a user wants to indicate that the user needs additional time before participating in an event, such as meeting for lunch, the user may enter dialog into text-to-send box 506, select a delay time period in delay time field 516, and click on Send as Alarm button 514 or execute the appropriate keystrokes to send an alarm message to the other chat participants.

For example, in FIG. 5A, Stephen wants to inquire whether Wayne is ready to meet for lunch. Stephen may type a message 518 (e.g., "ready for lunch?") into text-to-send box 506. Upon clicking on Send Message button 512, Stephen's message 518 is received by Wayne's instant messaging client as shown in FIG. 5B and displayed in conversation display area 510 in instant messaging chat window 502. Stephen's message is also displayed in the conversation display area in Stephen's instant messaging chat window 504.

If Wayne is unable to leave for lunch at the moment (e.g., Wayne is on a conference call), Wayne may communicate that he needs additional time before he will be free to meet for lunch. For example, in FIG. 5C, Wayne types message 520 (e.g., "give me 5 minutes") into text-to-send box 506 in instant message chat window 502. Wayne also types into or uses the up/down arrows on delay time field 516 to specify how much time he needs before he can leave for lunch (e.g., 5 minutes). At this point, rather than clicking on Send Message button 512, Wayne clicks on Send as Alarm button 514. By selecting Send as Alarm button 514, Wayne's message 520 is received by Stephen's instant messaging client as shown in FIG. 5D and displayed in conversation display area 510 in instant messaging chat window 504. Wayne's message 520 in FIG. 5C is also displayed in the conversation display area in Wayne's instant messaging chat window 502. The display of Wayne's message may also indicate that Wayne sent the message as an alarm.

During the specified time delay period of 5 minutes, Wayne may continue with his conference call and Stephen may continue to work on other things. After the specified time delay period has elapsed, Wayne and Stephen receive popup alarm reminder window 522 shown in FIG. 5E on their respective computers. Popup alarm reminder window 522 is used to notify the chat users that the time delay period has passed. In this example, popup alarm reminder window 522 comprises the current day and time 524 and message 526 (e.g., "give me 5 minutes") associated with the alarm. The type of information presented in the alarm reminder window 522 may be modified through application preferences as described in contact and control window 406 in FIG. 4. Once the user has received the popup reminder, the user may close the window, such as by clicking on "Close Window" button 528. Other options in popup alarm reminder window 522 may be provided to the user, such as allowing the user to dismiss the alarm (and thus notify the other chat users) if the user cannot participate in the event, or reschedule the alarm if the user needs additional time, such as by resetting the time delay period. Popup alarm reminder window 522 may also include an audible component to provide additional notifications that the specified time delay has passed. Thus, even though both Wayne and Stephen's focus may have shifted to another task, the mechanism of the present invention reminds them that they agreed to go to lunch within 5 minutes. Without the invention, an agreed upon time delay to go to lunch in 5 minutes may typically turn into 10 minutes or more, since the users may become distracted doing other tasks in the time delay period.

Although the examples in FIGS. 5A-5E show particular instant messaging window configurations, one of ordinary skill in the art would recognize that other window configurations may be used to implement the present invention and provide users with the capability to send and receive instant message communications and alarms.

FIGS. 6A-6B depict an example of source code for initiating an instant messaging application in accordance with an illustrative embodiment of the present invention. IMAlarms code 600 comprises typical code used to initiate an instant messaging application and create an instant messaging chat window in which a user may communicate with other chat participants. IMAlarms code 600 in FIGS. 6A-6B may be implemented in an instant messaging application, such as instant messaging client 400 in FIG. 4.

In this particular example, IMAlarms code 600 includes Java™ information used to setup the instant messaging chat window. In step 602, a new IMApplication 604 is called to initiate the chat session between Wayne and Stephen. The IMApplication code is further described in FIGS. 7A-7D below. It should be noted that although this particular example makes a call to IMApplication code to create a split screen instant messaging window comprising both the chat windows for Wayne and Stephen for illustration purposes, IMAlarms code 600 will typically comprise code for initiating a separate instant messaging chat window for each user on each user's instant messaging client.

FIGS. 7A-7D depict an example of source code for sending and receiving instant messages and alarms in accordance with an illustrative embodiment of the present invention. IMApplication code 700 is called by IMAlarms code 600 in FIGS. 6A-6B and comprises code similar to typical instant messaging applications, in that IMApplication code 700 is responsible for sending and receiving messages between the users' chat windows. IMApplication code 700 may be implemented in an instant messaging application, such as instant messaging client 400 in FIG. 4.

In steps 702 and 704, traditional instant messaging functions such as receivemessage and sendmessage are called. When a message is received at an instant messaging client, the incoming message is displayed to the user in step 702 in the appropriate conversation thread. Likewise, when a message is sent from the instant messaging client, the outgoing message is provided to the user in step 704 in the appropriate conversation thread.

In steps 706 and 708, receiveAlarm and sendAlarm functions are called. These functions extend the capabilities of existing instant messaging systems by providing alarm information to the chat users. For example, receiveAlarm is used to receive a user input that defines a time delay period, build a new timer to countdown the time delay period, and schedule the timer against the instant messaging client in step 706. IMApplication code 700 schedules the timer by calling IMAlarmTask code 710, which is further described in FIG. 8 below. When an alarm is sent from the instant messaging client, the alarm time period and associated message is displayed to the user in step 708 in the appropriate conversation thread, and the alarm is sent to the other chat participants as well. When an alarm is received at the other participants' instant messaging clients, the alarm time period and associated message is displayed to the users in step 706 in the appropriate conversation thread.

Although the receivemessage, sendmessage, receiveAlarm, and sendAlarm functions are broken out into separate methods in this example, the mechanism of the present invention allows for combining these methods. The combined send and receive methods subsequently will be parsed differently than if in separate methods.

FIG. 8 depicts an example of timing source code in accordance with an illustrative embodiment of the present invention. IMAlarmTask code 800 in FIG. 8 may be implemented in an instant messaging application, such as instant messaging client 400 in FIG. 4. In this illustrative example, IMAlarmTask code 800 comprises a Java timer, which is initiated when an alarm is received in IMApplication code 700 in FIGS. 7A-7D. When IMAlarmTask code 800 is called by IMApplication, the Java timer begins a countdown of the defined time period set by the user for the alarm. When the timer times out, IMAlarmTask initiates a popup alarm reminder window by calling IMAlarmDisplay 802, which is further described in FIGS. 9A-9B below.

FIGS. 9A-9B depict an example of source code for providing an alarm to a user in accordance with an illustrative embodiment of the present invention. IMAlarmDisplay code 900 may be implemented in an instant messaging application, such as instant messaging client 400 in FIG. 4. IMAlarmDisplay code 900 is called upon the timeout of IMAlarmTask 800 in FIG. 8.

Figure 5E:
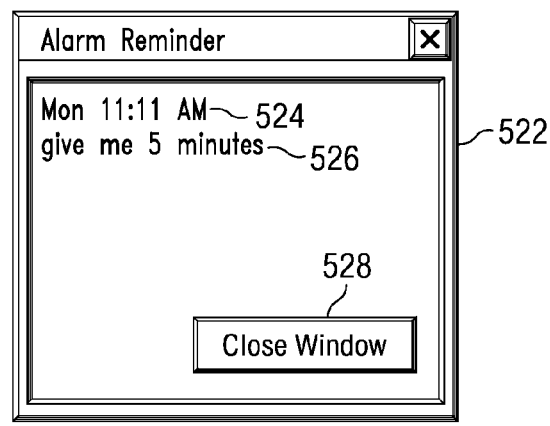

IMAlarmDisplay 900 comprises code for generating an alarm reminder window, such as popup alarm reminder window 522 in FIG. 5E. The popup alarm reminder window is used to alert the users that a specified period of time has elapsed, and thus they are reminded to participate in an agreed upon event or are redirected back to the chat window for an agreed upon chat meeting. In this illustrative example, the current time is obtained in step 902. AlarmText 904 function is called to display the time and the message associated with the alarm in the popup alarm reminder window. In this manner, a simplistic alert may be presented to the chat participants to remind them to participate in an event.

Turning now to FIG. 10, a flowchart of a process for providing instant messaging users with an alarm to remind the users of an event or to re-join an instant messaging chat in accordance with an illustrative embodiment of the present invention is shown. The process illustrated in FIG. 10 may be implemented in an instant messaging client, such as instant messaging client 400 in FIG. 4.

The process begins with a user's instant messaging client receiving a message from another participant in the instant messaging chat session (step 1002). The user's instant messaging client and the instant messaging clients of all other chat participants in this process are enabled with the alarm reminder features as described in FIGS. 5A-5D above. The message received may include a request that the user participate in an event, such as, for example, attending a meeting or going to lunch. If the user who receives the message is unable to chat with the sender or participate in the event at the current time, the user may define a period of time in the user's instant messaging chat window after which the user can participate in the event (step 1004). The user may also type a message into the text-to-send box. The user may then send an alarm message to the other chat participants (step 1006). The alarm message is then received and displayed to the participants in the chat session in a manner similar to a typical instant message (step 1008). The display may also include an indication that the message is an alarm message. If one or more overlapping alarm messages are received at an instant messaging client (e.g., a user receives an alarm message from one participant to delay the lunch meeting for 5 minutes and another alarm message from another participant to delay the lunch meeting for 10 minutes), the overlapping alarm messages may be processed in the same instant messaging chat instance. The alarm messages may be processed according to user specified preferences.

When the alarm message is received at each participant's instant messaging client, the instant messaging clients start their respective timers based on the period of time defined by the user (step 1010). When the timer times out (step 1012), the instant messaging client generates a popup alarm reminder window on each participant's screen (step 1014). The popup alarm window may include the current time and the user's message associated with the alarm, and may include audible components to provide additional notifications that the specified time delay has passed. Once the participants have received the popup alarm reminder window, the participants may close the window and participate in the event.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing a reminder of an event within a context of an instant messaging client, the computer implemented method comprising:
   receiving an instant message at an instant messaging client application, wherein the instant message includes a request for a user to currently participate in an event;
   if the user is currently unable to participate in the event, receiving input from the user to create an alarm message in the instant messaging client application, wherein the alarm message defines a time period after which the user is able to participate in the event, and wherein the alarm message is in a predetermined format defined by the user;
   sending, by the instant messaging client application, the alarm message to all users in the instant messaging chat session; and
   providing an alarm to the users in the instant messaging chat session upon expiration of the time period, wherein the alarm reminds the users to participate in the event, and wherein the alarm comprises a popup window that includes options allowing the participants to reset the time period defined by the user.

2. The computer implemented method of claim 1, further comprising:
   responsive to receiving the alarm message, initiating a countdown of the time period at one of the instant messaging client or the instant messaging server, wherein the instant messaging server propagates messages to users upon expiration of the time period.

3. The computer implemented method of claim 1, wherein the alarm comprises at least one of a visual or audible alarm.

4. The computer implemented method of claim 1, wherein the alarm message includes a text message created by the user.

5. The computer implemented method of claim 1, wherein the alarm message is sent to one of all or selected participants in the instant messaging chat session.

6. The computer implemented method of claim 1, wherein the event is one of a meeting, conference, or on-line collaboration.

7. The computer implemented method of claim 1, further comprising:
if one or more overlapping alarm messages are received at an instant messaging client, processing the one or more overlapping alarm messages in a same instant messaging chat instance.

8. A data processing system for providing a reminder of an event within a context of an instant messaging client, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to receive an instant message at an instant messaging client application, wherein the instant message includes a request for a user to currently participate in an event, receive input from the user to create an alarm message in the instant messaging client application if the user is currently unable to participate in the event, wherein the alarm message defines a time period after which the user is able to participate in the event, and wherein the alarm message is in a predetermined format defined by the user, send the alarm message to all users in the instant messaging chat session, and provide an alarm to the users in the instant messaging chat session upon expiration of the time period, wherein the alarm reminds the users to participate in the event, and wherein the alarm comprises a popup window that includes options allowing the participants to reset the time period defined by the user.

9. The data processing system of claim 8, wherein the processing unit further executes the computer usable code to initiate a countdown of the time period at one of the instant messaging client or the instant messaging server responsive to receiving the alarm message, wherein the instant messaging server propagates messages to users upon expiration of the time period.

10. The data processing system of claim 8, wherein the alarm comprises at least one of a visual or audible alarm.

11. A computer program product for providing a reminder of an event within a context of an instant messaging client, the computer program product comprising:
a computer usable storage medium having computer usable program code stored thereon, the computer usable program code comprising:
computer usable program code for receiving an instant message at an instant messaging client application, wherein the instant message includes a request for a user to currently participate in an event;
computer usable program code for receiving input from the user to create an alarm message in the instant messaging client application if the user is currently unable to participate in the event, wherein the alarm message defines a time period after which the user is able to participate in the event, and wherein the alarm message is in a predetermined format defined by the user;
computer usable program code for sending the alarm message to &l users in the instant messaging chat session; and
computer usable program code for providing an alarm to the users in the instant messaging chat session upon expiration of the time period, wherein the alarm reminds the users to participate in the event, and wherein the alarm comprises a popup window that includes options allowing the participants to reset the time period defined by the user.

12. The computer program product of claim 11, further comprising computer usable program code for initiating a countdown of the time period at one of the instant messaging client or the instant messaging server responsive to receiving the alarm message, wherein the instant messaging server propagates messages to users upon expiration of the time period.

13. The computer program product of claim 11, wherein the alarm comprises at least one of a visual or audible alarm.

14. The computer program product of claim 11, wherein the alarm message includes a text message created by the user.

* * * * *